US010055119B2

(12) United States Patent
Yun

(10) Patent No.: US 10,055,119 B2
(45) Date of Patent: Aug. 21, 2018

(54) USER INPUT METHOD AND APPARATUS IN ELECTRONIC DEVICE

(71) Applicant: Samsung Electronics Co., Ltd., Suwon-si, Gyeonggi-do (KR)

(72) Inventor: Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 14/610,183

(22) Filed: Jan. 30, 2015

(65) Prior Publication Data

US 2015/0220205 A1 Aug. 6, 2015

(30) Foreign Application Priority Data

Feb. 6, 2014 (KR) ........................ 10-2014-0013707

(51) Int. Cl.
| | |
|---|---|
| *G06F 3/041* | (2006.01) |
| *G06F 3/0488* | (2013.01) |
| *G06F 3/0482* | (2013.01) |
| *G06F 3/0484* | (2013.01) |
| *G06F 3/0354* | (2013.01) |
| *G06F 3/01* | (2006.01) |
| *G06F 3/0485* | (2013.01) |

(52) U.S. Cl.
CPC ........ *G06F 3/04883* (2013.01); *G06F 3/0485* (2013.01)

(58) Field of Classification Search
CPC ........................... G06F 3/04883; G06F 3/0485
See application file for complete search history.

(56) References Cited

U.S. PATENT DOCUMENTS

| | | | | |
|---|---|---|---|---|
| 6,061,051 | A * | 5/2000 | Chan | G06F 3/045 345/173 |
| 7,840,912 | B2 * | 11/2010 | Elias | G06F 3/04883 715/863 |
| 8,402,391 | B1 * | 3/2013 | Doray | G06F 3/0482 715/834 |
| 2007/0195069 | A1 | 8/2007 | Kable et al. | |
| 2010/0077354 | A1 * | 3/2010 | Russo | G06F 3/0482 715/834 |
| 2013/0152012 | A1 * | 6/2013 | Jarrett | G06F 3/0485 715/784 |
| 2014/0309865 | A1 * | 10/2014 | Ricci | H04W 48/04 701/36 |

* cited by examiner

*Primary Examiner* — Andrew Sasinowski
(74) *Attorney, Agent, or Firm* — Jefferson IP Law, LLP

(57) ABSTRACT

A user input method in an electronic device and the electronic device are provided. The user input method in an electronic device includes receiving, from a user input module configured to receive a touch input and having an inner region and a peripheral region defined as a specific area with a predetermined width, an input from the inner region to the peripheral region, detecting a moving path of the received input, and performing an operation mapped to the detected moving path.

10 Claims, 15 Drawing Sheets

USER INPUT METHOD AND APPARATUS IN ELECTRONIC DEVICE

CROSS-REFERENCE TO RELATED APPLICATION(S)

This application claims the benefit under 35 U.S.C. § 119(a) of a Korean patent application filed on Feb. 6, 2014 in the Korean Intellectual Property Office and assigned Serial No. 10-2014-0013707, the entire disclosure of which is hereby incorporated by reference.

TECHNICAL FIELD

The present disclosure relates to a method and apparatus for a user input in an electronic device.

BACKGROUND

Recently, a user's input technique for electronic devices has been realized in a great variety of forms. While a traditional input technique is to press a mechanical button equipped in the electronic device, various improved input techniques are now used such as a touch-based input technique, a voice recognition input technique, a fingerprint scan input technique, a pen-based input technique, a mouse-based input technique, or the like.

Among them, a touch-based input technique has been widely used in these days. Typically, according to input detection mechanisms, a touch-based input technique may have various input schemes such as using a touch pad, using an electro-magnetic resonance (EMR) pad, using a sensor, a camera, and the like.

Additionally, recent electronic devices have widely used a pen or an electronic pen as another form of a touch input technique. Such input techniques may be improved to offer a more user-friendly interface.

For example, a touch-sensitive electronic device is now offering various intuitive input schemes to users, such as a touch and drag for selecting and moving an object or for swiping a page, or a pinch in or out for reducing or enlarging a screen.

Some of them may be equally or similarly applied to a pen or electronic pen. For example, in an electronic device having a pen or electronic pen, a page swipe may be performed using a touch and drag input of the pen or electronic pen.

However, typical input techniques are merely offering a few intuitive input schemes. Contrary to that, functions offered by electronic devices are increased rapidly in number. Further, there are growing demands for more various input techniques.

For example, while a user who uses a pen or electronic pen writes a document or draws a picture, he or she may often feel a need to enlarge a specific portion and then desire to move the enlarged portion. However, a movement of enlarged portion may require several operations such as reducing the enlarged portion to an original size, moving the reduced portion, selecting a desired portion to be enlarged, and enlarging the selected portion.

In addition, although various functions such as copying, mode changing, page swiping, etc. are increasing, typical input techniques have difficulties in performing such functions by means of simple input schemes.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing more various functions through a simplified user input in an electronic device.

In accordance with an aspect of the present disclosure, a user input method in an electronic device is provided. The method includes receiving, from a user input module configured to receive a touch input and having an inner region and a peripheral region defined as a specific area with a predetermined width, an input from the inner region to the peripheral region, detecting a moving path of the received input, and performing an operation mapped to the detected moving path.

In accordance with another aspect of the present disclosure, an electronic device for operating in response to a user input is provided. The electronic device includes a user input module configured to receive a touch input and having an inner region and a peripheral region defined as a specific area with a predetermined width, a memory configured to store therein a mapping relation between inputs from the user input module and operations to be performed in the electronic device, and a processor configured to receive an input from the inner region to the peripheral region, to detect a moving path of the received input, and to perform an operation mapped to the detected moving path.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
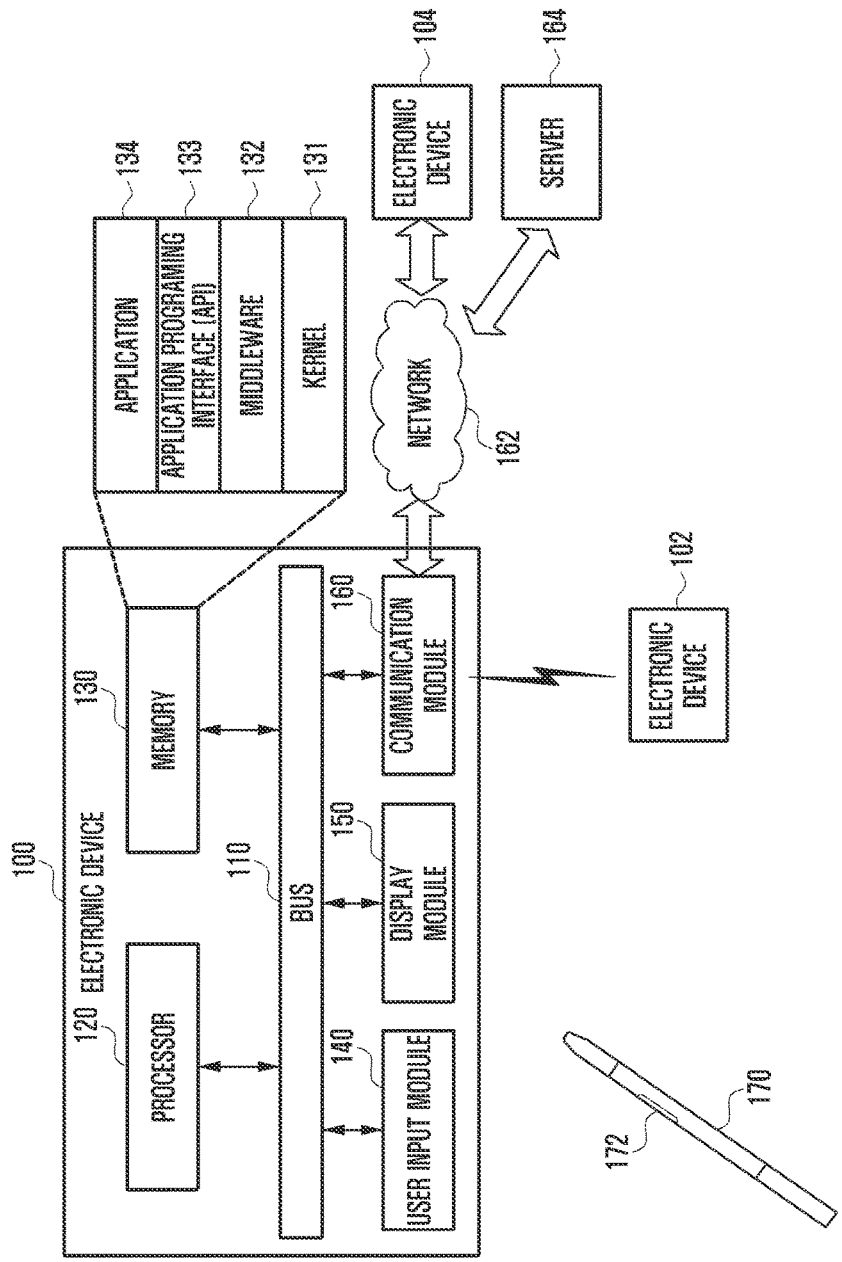
FIG. 1 is a block diagram illustrating an electronic device and related input environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, the electronic device 100 may include a bus 110, a processor 120, a memory 130, a user input module 140, a display module 150, a communication module 160, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the user input module 140, the display module 150, the communication module 160, etc.) through the bus 110, may interpret the received commands, and may execute calculation or data processing according to the interpreted commands.

The memory 130 may store commands or data received from the processor 120 or other elements (e.g., the user input module 140, the display module 150, the communication module 160, etc.) or generated by the processor 120 or the other elements. The memory 130 may include programming modules, such as a kernel 131, middleware 132, an Application Programming Interface (API) 133, an application 134, and the like. Each of the above-described programming modules may be implemented in software, firmware, hardware, or a combination of two or more thereof.

Additionally, according to various embodiments of the present disclosure, the memory 130 may store therein a mapping relation between user inputs and particular operations to be performed in response to such inputs. This will be described below with reference to the drawings.

The kernel 131 may control or manage system resources (e.g., the bus 110, the processor 120, the memory 130, etc.) used to execute operations or functions implemented by other programming modules (e.g., the middleware 132, the API 133, and the application 134). Also, the kernel 131 may provide an interface capable of accessing and controlling or managing the individual elements of the electronic device 100 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. Also, in relation to work requests received from one or more of the application 134 and/or the middleware 132, for example, may perform load balancing of the work requests by using a method of assigning a priority, in which system resources (e.g., the bus 110, the processor 120, the memory 130, etc.) of the electronic device 100 can be used, to at least one of the one or more of the application 134.

The API 133 is an interface through which the application 134 is capable of controlling a function provided by the kernel 131 or the middleware 132, and may include, for example, at least one interface or function for file control, window control, image processing, character control, or the like.

The user input module 140, for example, may receive a command or data as input from a user, and may deliver the received command or data to the processor 120 or the memory 130 through the bus 110. The display module 150 may display a video, an image, data, or the like to the user.

The communication module 160 may connect communication between another electronic device 102 and the electronic device 100. The communication module 160 may support a predetermined short-range communication protocol (e.g., Wireless Fidelity (Wi-Fi), BlueTooth (BT), and Near Field Communication (NFC)), or predetermined network communication via a network 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 100. Further, the communication module 160 may connect communication between a server 164 and the electronic device 100 via the network 162.

Additionally, an electronic pen 170 is shown as an input device of the electronic device 100. The electronic device 100 is configured to detect the approach, touch or button input of the electronic pen 170 through the user input module 140. Therefore, the electronic pen 170 may be configured to allow the user input module 140 of the electronic device 100 to detect different values in response to the approach or touch of the electronic pen 170 or the press of a button 172 of the electronic pen 170. The electronic pen 170 may employ existing pen devices widely used in various electronic devices such as computers, smart phones, tablet PCs, and the like, and also employ any other advanced pen device to be developed later. Only required for the electronic pen in various embodiments of the present disclosure is the ability to distinguish between approach and touch, and if there is a button, to detect the press of the button.

An internal structure of the electronic pen 170 is not limited.

Figure 2:
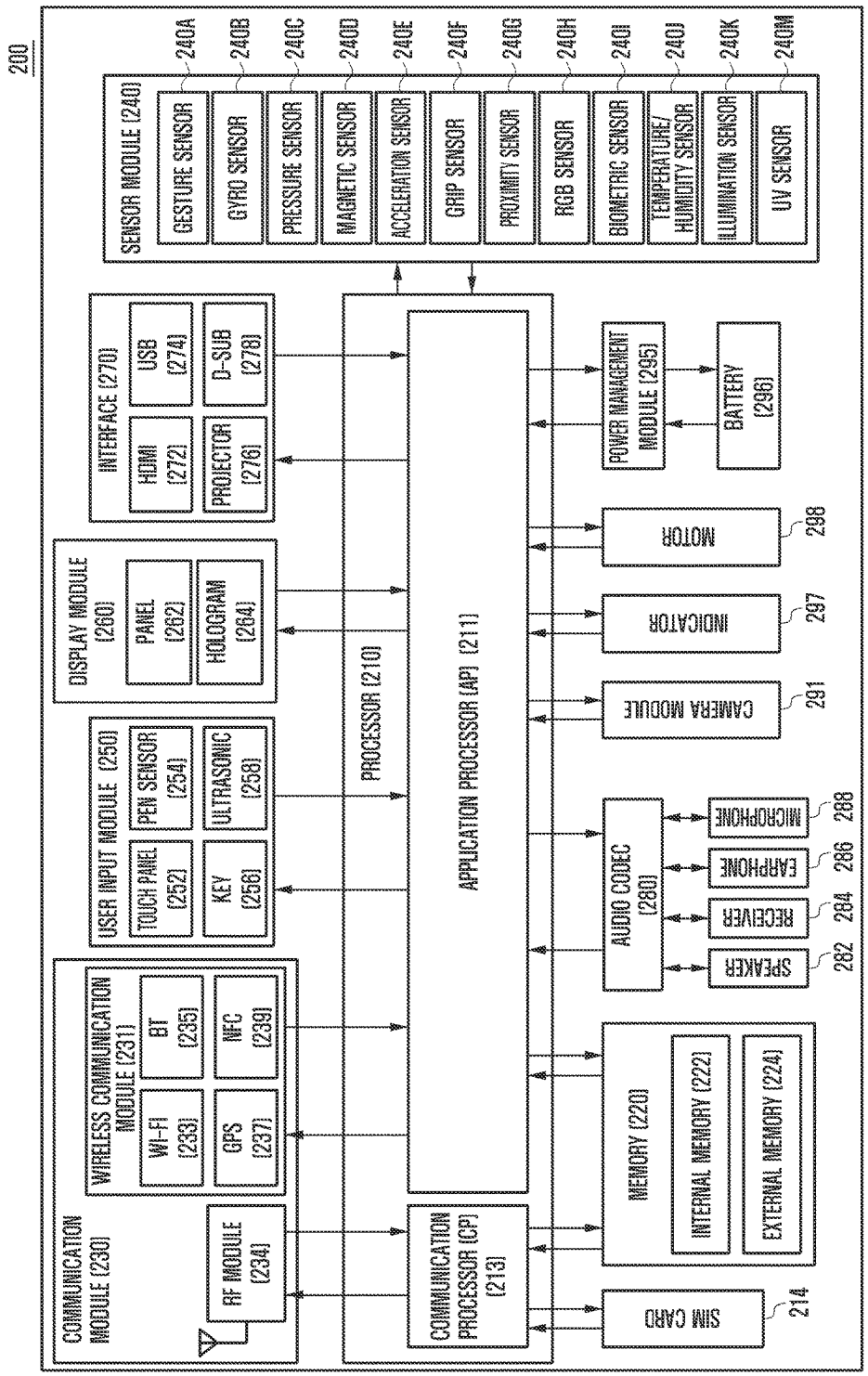
FIG. 2 is a block diagram illustrating hardware for an electronic device according to an embodiment of the present disclosure.

FIG. 2 is a block diagram illustrating hardware for an electronic device according to an embodiment of the present disclosure.

The electronic device 200 may be, for example, the electronic device 100 illustrated in FIG. 1.

Referring to FIG. 2, the electronic device 200 may include one or more processors 210, a Subscriber Identification Module (SIM) card 214, a memory 220, a communication module 230, a sensor module 240, a user input module 250, a display module 260, an interface 270, an audio coder/decoder (codec) 280, a camera module 291, a power management module 295, a battery 296, an indicator 297, a motor 298 and any other similar and/or suitable components.

The processor 210 (e.g., the processor 120) may include one or more Application Processors (APs) 211, or one or more Communication Processors (CPs) 213. The processor 210 may be, for example, the processor 120 illustrated in FIG. 1. The AP 211 and the CP 213 are illustrated as being included in the processor 210 in FIG. 2, but may be included in different Integrated Circuit (IC) packages, respectively. According to an embodiment of the present disclosure, the AP 211 and the CP 213 may be included in one IC package.

The AP 211 may execute an Operating System (OS) or an application program, and thereby may control multiple hardware or software elements connected to the AP 211 and may perform processing of and arithmetic operations on various data including multimedia data. The AP 211 may be implemented by, for example, a System on Chip (SoC). According to an embodiment of the present disclosure, the processor 210 may further include a Graphical Processing Unit (GPU) (not illustrated).

The CP 213 may manage a data line and may convert a communication protocol in the case of communication between the electronic device (e.g., the electronic device 100) including the electronic device 200 and different electronic devices connected to the electronic device through the network. The CP 213 may be implemented by, for example, a SoC. According to an embodiment of the present disclosure, the CP 213 may perform at least some of multimedia control functions. The CP 213, for example, may distinguish and authenticate a terminal in a communication network by using a SIM (e.g., the SIM card 214). Also, the CP 213 may provide the user with services, such as a voice telephony call, a video telephony call, a text message, packet data, and the like.

Further, the CP 213 may control the transmission and reception of data by the communication module 230. Referring to FIG. 2, the elements such as the CP 213, the power management module 295, the memory 220, and the like are illustrated as elements separate from the AP 211. However, according to an embodiment of the present disclosure, the AP 211 may include at least some (e.g., the CP 213) of the above-described elements.

According to an embodiment of the present disclosure, the AP 211 or the CP 213 may load, to a volatile memory, a command or data received from at least one of a non-volatile memory and other elements connected to each of the AP 211 and the CP 213, and may process the loaded command or data. Also, the AP 211 or the CP 213 may store, in a non-volatile memory, data received from or generated by at least one of the other elements.

The SIM card 214 may be a card implementing a subscriber identification module, and may be inserted into a slot formed in a particular portion of the electronic device 100. The SIM card 214 may include unique identification information (e.g., Integrated Circuit Card IDentifier (ICCID)) or subscriber information (e.g., International Mobile Subscriber Identity (IMSI)).

The memory 220 may include an internal memory 222 and an external memory 224. The memory 220 may be, for example, the memory 130 illustrated in FIG. 1. The internal memory 222 may include, for example, at least one of a volatile memory (e.g., a Dynamic Random Access Memory (DRAM), a Static RAM (SRAM), a Synchronous Dynamic RAM (SDRAM), etc.), and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 222 may be in the form of a Solid State Drive (SSD). The external memory 224 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

Additionally, as previously discussed in FIG. 1, the memory 220 may store therein a mapping relation between user inputs and particular operations to be processed in response to such inputs. This will be described in more detail with reference to drawings.

The communication module 230 may include a wireless communication module 231 or a Radio Frequency (RF) module 234. The communication module 230 may be, for example, the communication module 160 illustrated in FIG. 1. The wireless communication module 231 may include, for example, a Wi-Fi part 233, a BT part 235, a GPS part 237, or a NFC part 239. For example, the wireless communication module 231 may provide a wireless communication function by using a radio frequency. Additionally or alternatively, the wireless communication module 231 may include a network interface (e.g., a LAN card), a modulator/demodulator (modem), or the like for connecting the electronic device 200 to a network (e.g., the Internet, a LAN, a WAN, a telecommunication network, a cellular network, a satellite network, a POTS, or the like).

The RF module 234 may be used for transmission and reception of data, for example, transmission and reception of RF signals or called electronic signals. Although not illustrated, the RF module 234 may include, for example, a transceiver, a Power Amplifier Module (PAM), a frequency filter, a Low Noise Amplifier (LNA), or the like. Also, the RF module 234 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The user input module 250 may include a touch panel 252, a pen sensor 254 (e.g., a digital pen sensor), keys 256, and an ultrasonic input unit 258. The user input module 250 may be, for example, the user input module 140 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the electronic device 200 may receive a user input from an external device (e.g., a network, a computer, or a server), which is connected to the communication module 230, through the communication module 230.

The display module 260 may include a panel 262 or a hologram 264. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, a projector 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the electronic device 200. Although not illustrated, the power management module 295 may include, for example, a Power Management Integrated Circuit (PMIC), a charger IC, or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the electronic device 200 or a part (e.g., the AP 211) of the electronic device 200, for example, a booting state, a message state, a charging state and the like. The motor 298 may convert an electrical signal into a mechanical vibration. The processor 210 may control the sensor module 240.

Although not illustrated, the electronic device 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the electronic device 200 according to an embodiment of the present disclosure may include one or more components, and the name of the relevant element may change depending on the type of electronic device. The electronic device 200 according to an embodiment of the present disclosure may include at least one of the above-described elements. Some of the above-described elements may be omitted from the electronic device 200, or the electronic device 200 may further include additional elements. Also, some of the elements of the electronic device 200 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future.

Figure 3:
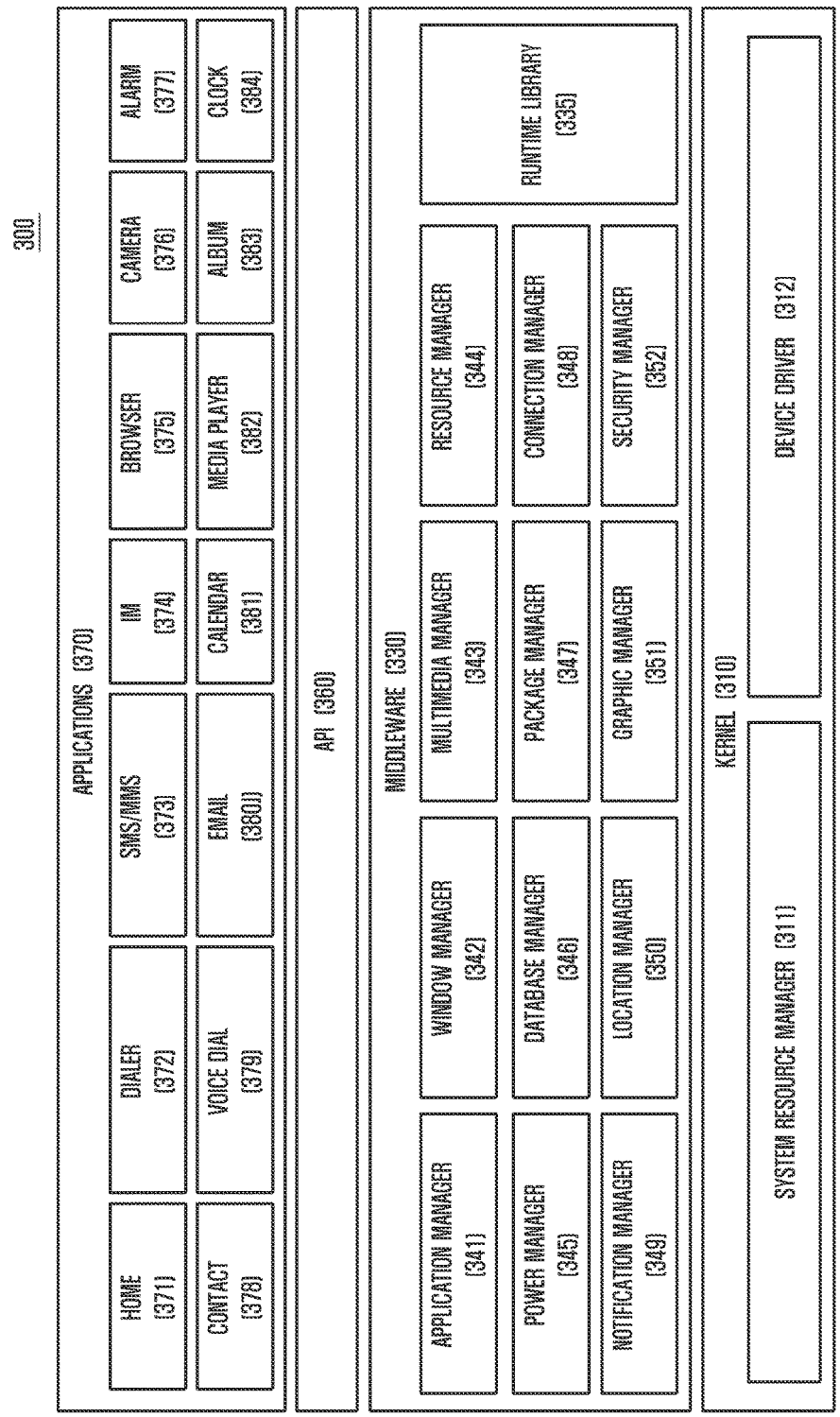
FIG. 3 is a block diagram illustrating a programming module installable in an electronic device according to an embodiment of the present disclosure.

FIG. 3 is a block diagram illustrating a configuration of a programming module 300 according to an embodiment of the present disclosure.

The programming module 300 may be included (or stored) in the electronic device 100 (e.g., the memory 130) illustrated in FIG. 1 or may be included (or stored) in the electronic device 200 (e.g., the memory 220) illustrated in FIG. 2. At least a part of the programming module 300 may be implemented in software, firmware, hardware, or a combination of two or more thereof. The programming module 300 may be implemented in hardware (e.g., the electronic device 200), and may include an OS controlling resources related to an electronic device (e.g., the electronic device 100) and/or various applications (e.g., applications 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the applications 370.

The kernel 310 (e.g., the kernel 131) may include a system resource manager 311 and/or a device driver 312. The system resource manager (not illustrated) may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a compiler, in order to add a new function by using a programming language during the execution of the applications 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage Graphical User Interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The application 370 (e.g., the application 134) may include, for example, a preloaded application and/or a third party application. The application 370 (e.g., the application 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Various embodiments of the present disclosure are focused on case of detecting a user's input in an input mode using a pen or electronic pen and then performing a corresponding operation. This input mode using a pen or electronic pen may refer to a mode in which a user inputs characters, numbers, symbols, pictures, etc. with a pen or electronic pen. In this input mode, a suitable program or application (sometimes abbreviated to app) for writing a document or painting may be executed.

Figure 4:
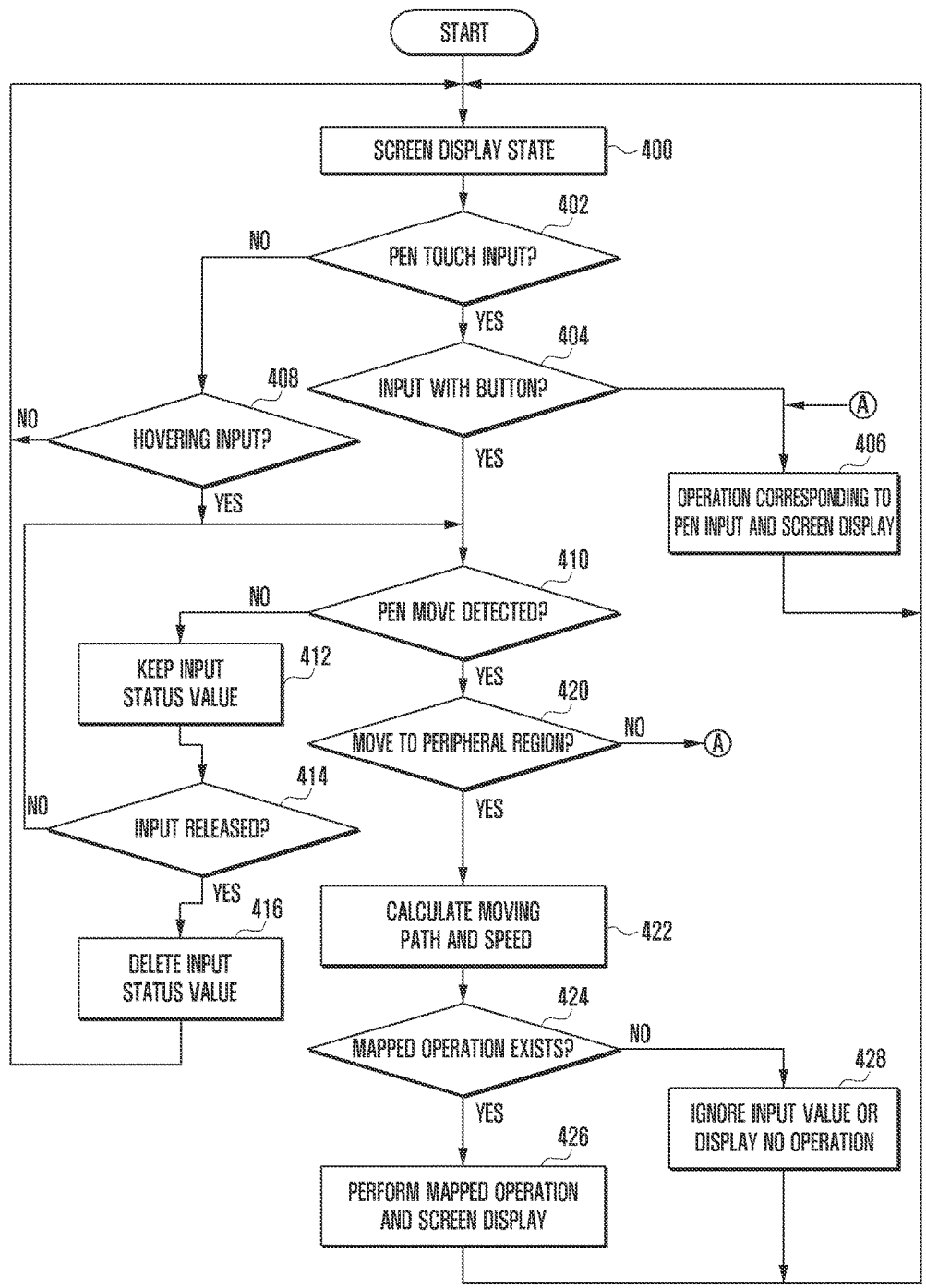
FIG. 4 is a flow diagram illustrating a method for controlling the operation of an electronic device in a pen-based input mode according to an embodiment of the present disclosure.

FIG. 4 is a flow diagram illustrating a method for controlling the operation of an electronic device in a pen-based input mode according to an embodiment of the present disclosure.

The following description regarding FIG. 4 will further refer to FIG. 2 showing the electronic device discussed above.

At operation 400, the processor 210 maintains a screen display state. The screen display state may be a state in which the above-mentioned program or application is driven initially using the display module 260, a state in which a stored file is read using the above-mentioned program or application, a state in which writing a document or painting is performed using the above-mentioned program or application, or a state in which a selected part is enlarged or reduced in writing a document or painting. This will be further described with reference to FIGS. 5A and 5B.

Figure 5A:
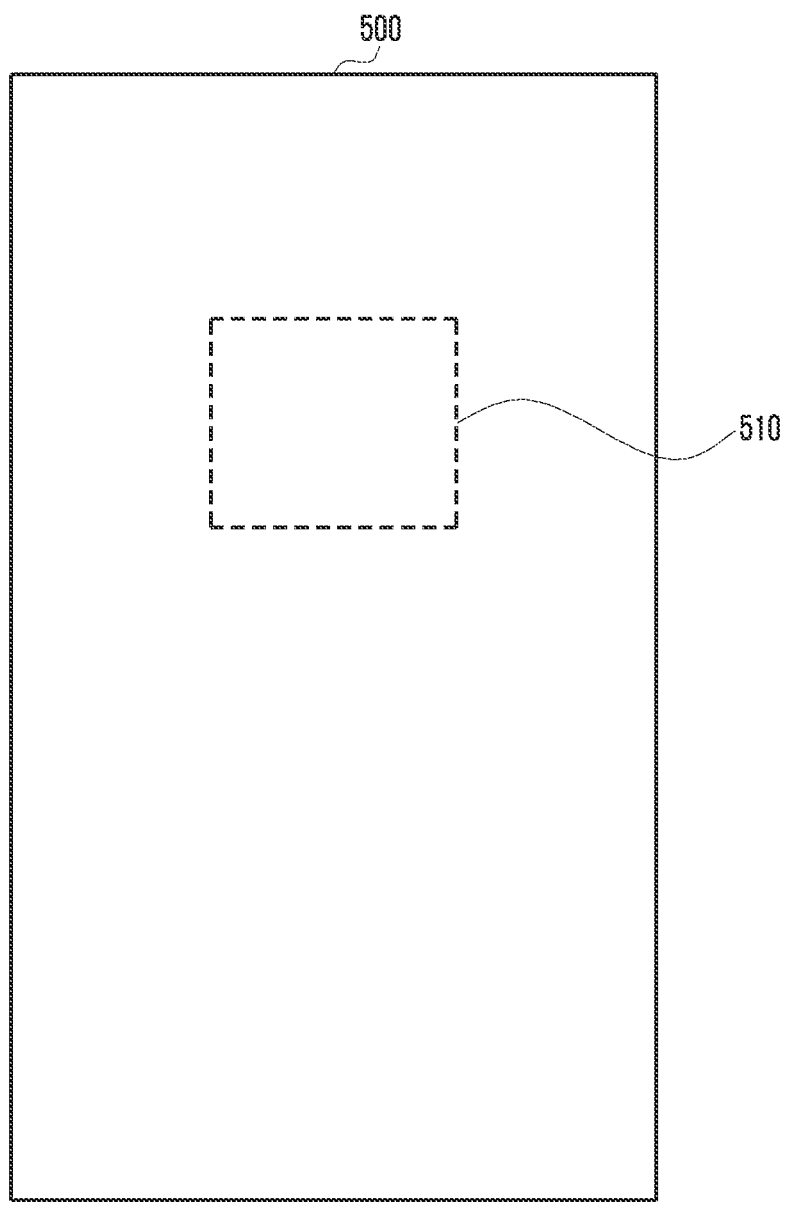
FIG. 5A shows the whole of a document and a part thereof to be enlarged according to an embodiment of the present disclosure.
Figure 5B:
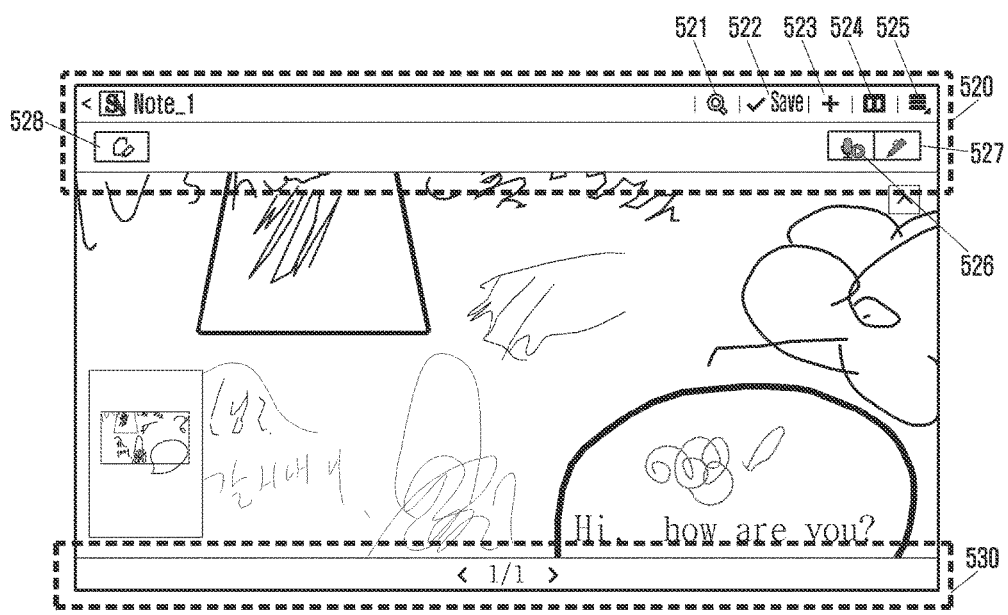
FIG. 5B shows an enlarged part of the whole document according to an embodiment of the present disclosure.

FIG. 5A shows the whole of a document and a part thereof to be enlarged according to an embodiment of the present disclosure, and FIG. 5B shows an enlarged part of the whole document according to an embodiment of the present disclosure.

Referring to FIG. 5A, a reference numeral 500 indicates the whole of a document which is being written using an input action of an electronic pen or a user's touch input. The whole document 500 may have a predetermined size, which is, for example, one of the A4 size, the A5 size, a size of user-defined width and length, or a default size of width and length predefined by a manufacturer of the electronic device. If the whole document is displayed in a full size on the display module 260 of the electronic device 200, a user may experience inconvenience of input. For example, if an A4-sized page is displayed in a full size on a 6-inch display module, displayed characters have too small a size to be identified. Also, when a user inputs characters, pictures, etc. through an electronic pen or a touch, an input size may be much greater than a desired size. Therefore, a user may usually zoom in an input target area of the page rather than keeping the page displayed in an original size.

Referring to FIG. 5B, a selected part of the whole document being processed in the electronic device 200 may be enlarged in size to fit the display module 260. A reference numeral 520 indicates an icon display region that contains icons for triggering predefined operations of the electronic device 200. For example, a search icon 521 used to search for specific characters, symbols, etc., a save icon 522 used to save a current document, an enlarge icon 523, and the like may be contained. A region below the icon display region may correspond to a selected region 510 for enlargement as shown in FIG. 5A. Additionally, referring to FIG. 5B, a page display bar 530 may be further included for showing the amount of the whole document. The operation 400 in FIG. 4 may be a state where a specific region is enlarged as shown in FIG. 5B or a state where the whole document is displayed, namely, prior to enlargement, as shown in FIG. 5A.

In a state where a specific document is displayed on the display module 260 at operation 400, the processor 210 may check at operation 402 whether there is a pen touch input from the user input module 250. The touch pen input may be detected through the touch panel 252 or the pen sensor 254 of the user input module 250. If any pen touch input is detected at operation 402, operation 404 follows. Otherwise, operation 408 follows.

If no pen touch input is detected, the processor 210 further checks at operation 408 whether there is a hovering input of an electronic pen. If so, operation 410 follows. Otherwise, operation 400 is maintained.

Herein, a hovering refers to a particular case in which an electronic pen or a human body is approaching within a predetermined distance from the user input module 250 of the electronic device 200. For example, in this case, the pen sensor 254 of the electronic device 200 may recognize the approach of an electronic pen or a human body within a predetermined distance. This distance which allows the pen sensor 254 or any other equivalent (not shown) to detect the approach may be usually 2-5 cm. However, if enhanced sensing technology has the ability to detect a much longer distanced approach, a hovering distance may also be extended.

At operation 404 after operation 402, the processor 210 may check whether an input of the button 172 of the electronic pen 170 is also detected together with a touch input of the electronic pen 170. If so, namely if a button input is also detected, operation 410 follows. Otherwise, namely if there is a touch input, operation 406 follows.

At operation 406, the processor 210 may perform a particular operation corresponding to the pen input and display a result thereof on the display module 260. For example, the operation of 406 may be a case of drawing characters, numbers, symbols, or pictures with a touched electronic pen. Alternatively, the operation of 406 may be a case of selecting a user-desired icon, e.g., one of icons from 521 to 528 arranged in the icon region 520 shown in FIG. 5B. In response to this, the processor 210 may perform drawing characters, numbers, symbols, or pictures on the display module or perform a particular operation corresponding to the selected icon.

At operation 410 after operation 404 or 408, the processor 210 checks whether a movement of an electronic pen is detected using a signal received from the user input module 250. If so, operation 420 follows. Otherwise, operation 412 follows.

At operation 412, the processor 210 may keep an input status value. For example, in case a touch input exists together with a button input from the user input module 250, the processor 210 may maintain coordinate values of both the touch input and the button input. Additionally, in case a hovering is detected from the user input module 250 and a hovering state is maintained, the processor 210 may maintain a hovering coordinate value. Then, at operation 414, the processor 210 checks whether the hovering state is released or whether the touch input with the button input is released. The release of the hovering state may be the departure of the electronic pen from a hovering detectable range or a change from a hovering state to a touch state. Also, the release of the touch input with the button input may be the removal of a button press or the removal of a touch state or both.

If an input release is detected at operation 414, the processor 210 may delete at operation 416 the input status value being kept at operation 412 and return to operation 400. Otherwise, if there is no input release at operation 414, the processor 210 may return to operation 410.

Meanwhile, at operation 420 after operation 410, the processor 210 may check whether the electronic pen 170 or a user's body moves toward a predetermined region, e.g., an outer peripheral region. This will be described hereinbefore with reference to the drawings.

Figure 6A:
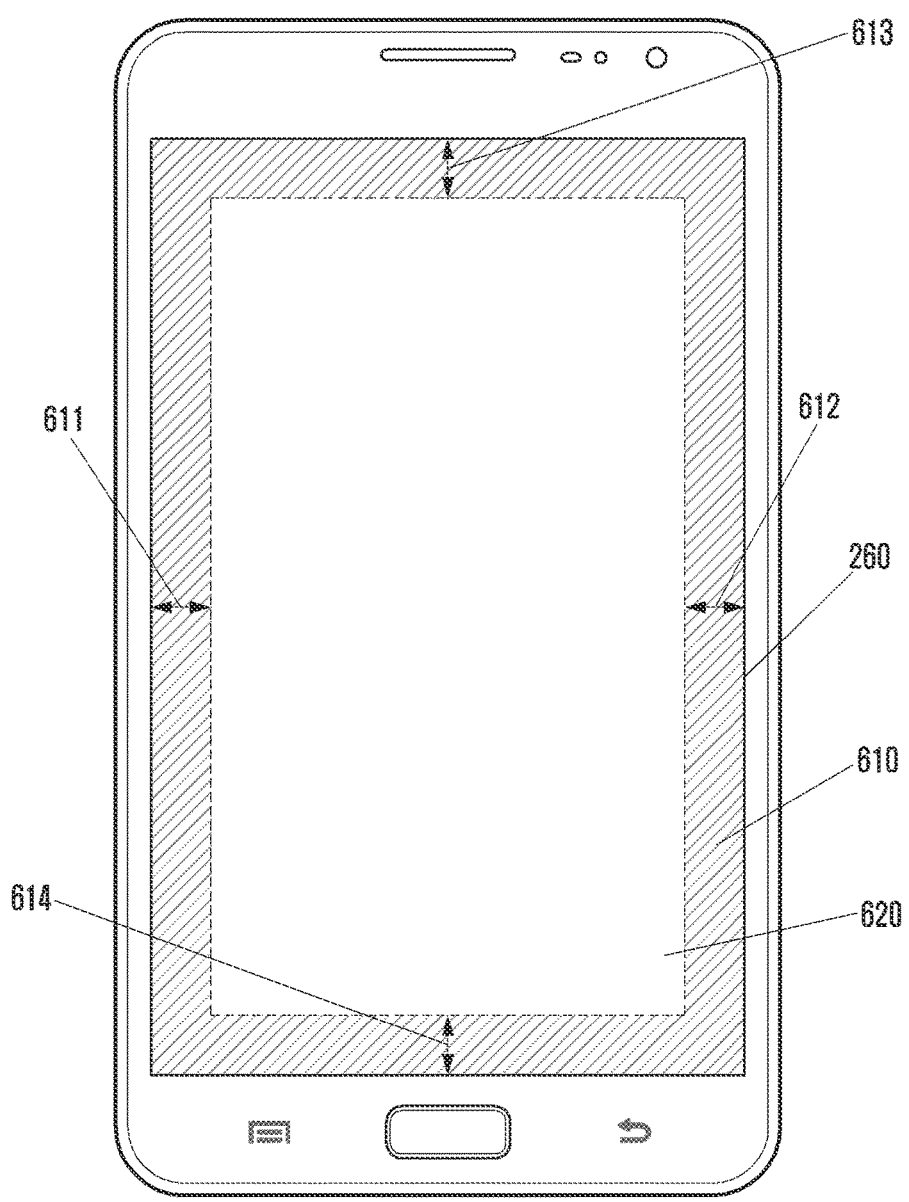
FIG. 6A shows an outer peripheral region within a user input detection region in an electronic device according to an embodiment of the present disclosure.

FIG. 6A shows an outer peripheral region within a user input detection region in an electronic device according to an embodiment of the present disclosure.

FIG. 6A shows the front side of the electronic device including the display module 260. An upper portion of the display module 260 may be formed of a transparent glass or glassy material or transparent plastic. Additionally, the display module 260 may be overlapped, at the top or bottom thereof, with the user input module 250 for detecting a user's touch input or pen input.

In this case, the user input module 250 may have the same sized detection region as the display module 260 or be smaller or greater in size than the display module 260. For example, if the display module 260 has a size of about 6 inch, the user input module 250 may be formed of the same sized shape in width and length or be smaller or greater in size by a predetermined dimension, e.g., 1 mm, than the size of width and length of the display module 260. Hereinafter, it is supposed that the display module 260 and the user input module 250 are overlapped with each other in the same size.

When the user input module 250 has the same size as the display module 260, there is an outer peripheral region as represented by slash lines and indicated by a reference numeral 610 in an embodiment of the present disclosure. The outer peripheral region may be defined as the outermost area that has the ability to detect a touch or hovering state of the electronic pen 170 or user's finger. Specifically, compared with an inner central region 620 that has a sensor array for detecting a touch or hovering, the outer peripheral region 610 has a set of sensors disposed at the outermost area surrounding the inner central region 620. Such an outer peripheral region 610 may be set at a manufacture by a manufacturer or varied in use by a user.

Referring to FIG. 6A, the display module 260 may have the outer peripheral region with a given width at left, right, upper and lower portions thereof. Specifically, a left peripheral region 611 of the display module 260 may have the same width as a right peripheral region 612 has. For example, in case the left peripheral region 611 is set as an inward area with 5 mm in width from the left end of the user input module 250, the right peripheral region 612 may be set as an inward area with 5 mm in width from the right end. Alternatively, the left and right peripheral regions 611 and 612 may have different shapes, and one of both may be removed.

Similarly, an upper peripheral region 613 of the display module 260 may have the same width as a lower peripheral region 614 has. For example, in case the upper peripheral region 613 is set as an inward area with 5 mm in width from the top end of the user input module 250, the lower peripheral region 614 may be set as an inward area with 5 mm in width from the bottom end. Alternatively, the upper and lower peripheral regions 613 and 614 may have different shapes, and one of both may be removed.

Referring again to FIG. 4, operation 420 may be to detect a movement toward one of the above-discussed four peripheral regions. For example, operation 420 is to detect whether an electronic pen moves toward one of the left, right, upper and lower peripheral regions as shown in FIG. 6A.

If there is a movement toward the peripheral region at operation 420, operation 422 follows. Otherwise, operation 406 or 428 may follow. In case operation 428 is performed after operation 420, an input value may be ignored. FIG. 4 focuses a case where operation 406 is performed after operation 420.

In this case, namely when there is no movement toward any peripheral region, a particular operation corresponding to the input may be performed. For example, in case of a hovering, a pointer may be moved in response to the hovering input. If there is a pen touch with button input, act of selecting a specific menu or the like may be made.

At operation 422 after operation 420, the processor 210 calculates a moving path and a moving speed of the pen input. The moving path may be calculated using variation of coordinate values for a predetermined time before the entrance into the peripheral region. The moving speed may also be calculated using such coordinate values and the predetermined time. At this time, if the calculated moving speed fails to satisfy a predetermined speed, the processor 210 may not perform a mapping.

Also, the moving path may be calculated using coordinates before the entrance into the peripheral region. Thus, the processor 210 may obtain coordinates from sensors in a unit of predetermined time intervals, e.g., 0.01 ms or 0.02 ms, for a predetermined time, e.g., 0.1 ms or 0.5 ms, before the electronic pen 170 enters into the peripheral region.

Thereafter, at operation 424, the processor 210 checks whether there is a particular operation mapped with the moving path and/or the moving speed. Herein, the moving path may be used for determining a particular operation mapped therewith, and the moving speed may be used for determining whether to perform such a particular operation. Various particular operations may be mapped with angles of the moving path entered into the peripheral region and also be executed on the condition that the moving speed is satisfied.

For example, one operation is mapped with an outward movement in a right direction, another operation is mapped with another outward movement in a right and upper direction, and still another operation is mapped with still another outward movement in a right and lower direction. In this case, although such mapped operations are defined, each operation may not be performed unless a movement satisfies a given speed. Now, a mapping relation between a movement of the electronic pen and a particular operation will be described with reference to FIGS. 6B to 6F.

FIGS. 6B to 6F show schemes of detecting a movement toward an outer peripheral region in an electronic device according to various embodiments of the present disclosure.

Figure 6B:
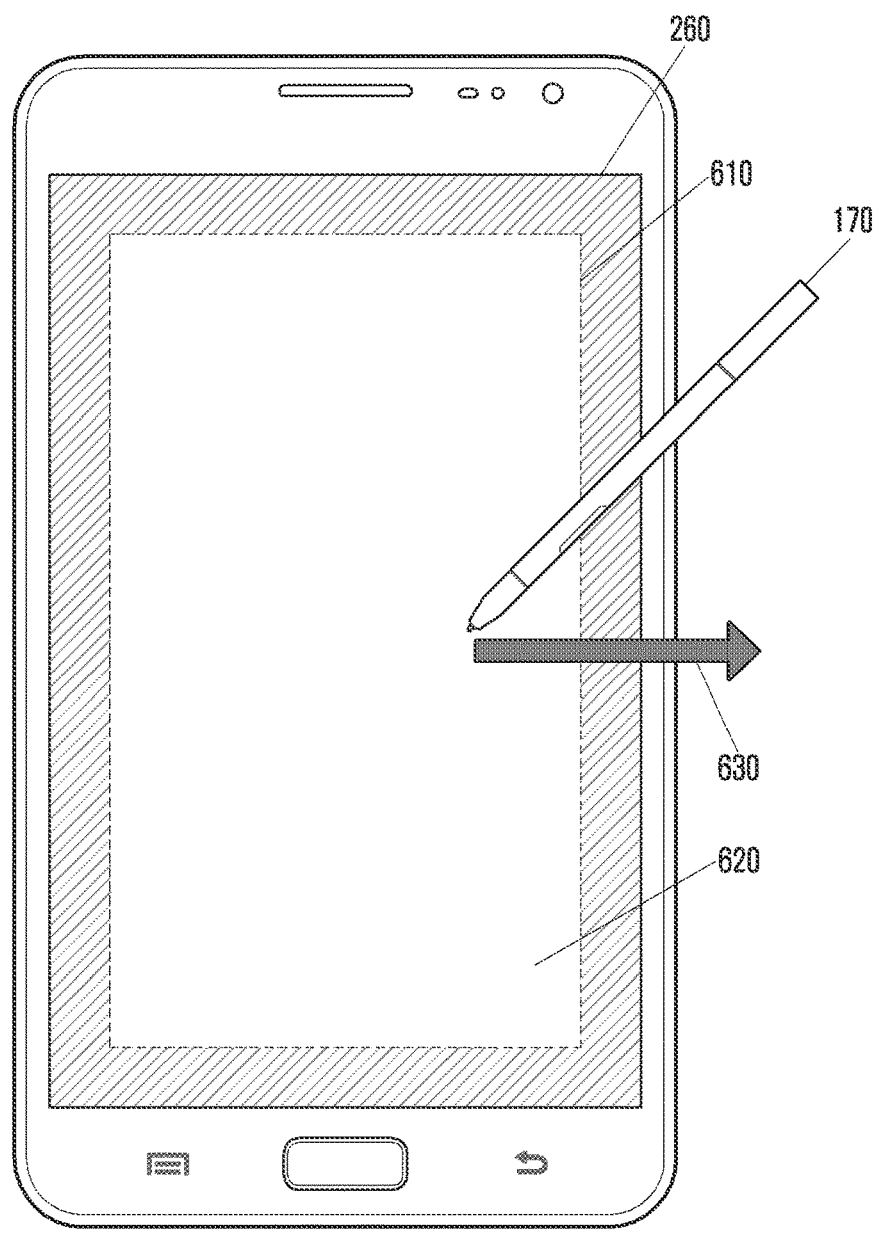
FIGS. 6B, 6C, 6D, 6E, and 6F show schemes of detecting a movement toward an outer peripheral region in an electronic device according to various embodiments of the present disclosure.
Figure 6C:
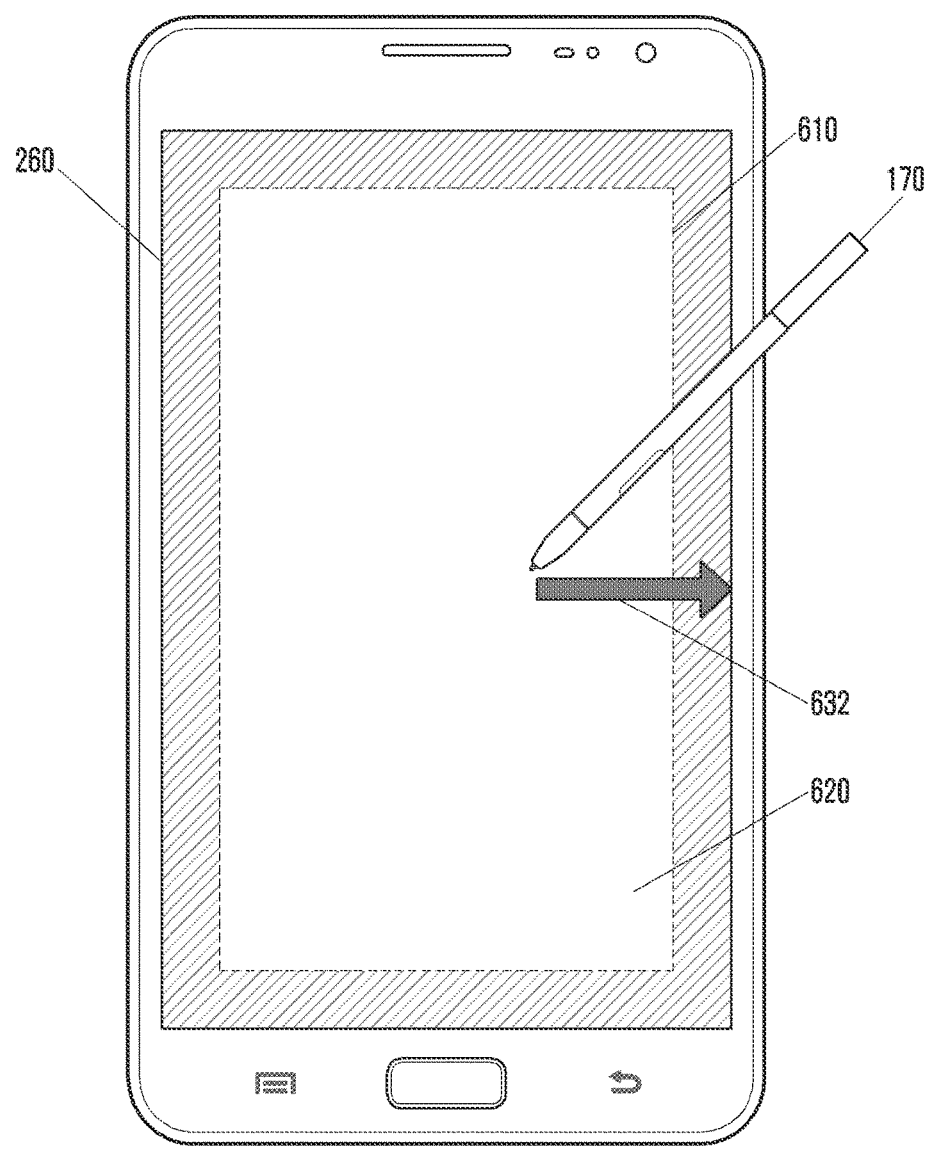

First referring to FIGS. 6B and 6C, two moving paths of the electronic pen 170 are shown. As indicated by a reference numeral 630, a moving path may pass through the outer peripheral region 610 of the user input module 250 overlapped with the display module 260 and then get out of the display module 260. Otherwise, as indicated by a reference numeral 632, a moving path may stop in the outer peripheral region 610 of the user input module 250. Normally, the former may often occur in case of a hovering, and the latter may often occur in case of a touch and drag with a button pressed. However, sometimes, the former may occur in case of a touch and drag with a button pressed, and the latter may occur in case of a hovering.

These two moving paths may be mapped with the same operation or different operations. Available operations may be, for example, a movement, reduction, or additional enlargement of an enlarged portion in a drawing task. Besides, any other particular operation such as loading a photo or file, taking a photo, recording a video, etc. may be mapped.

Figure 6D:
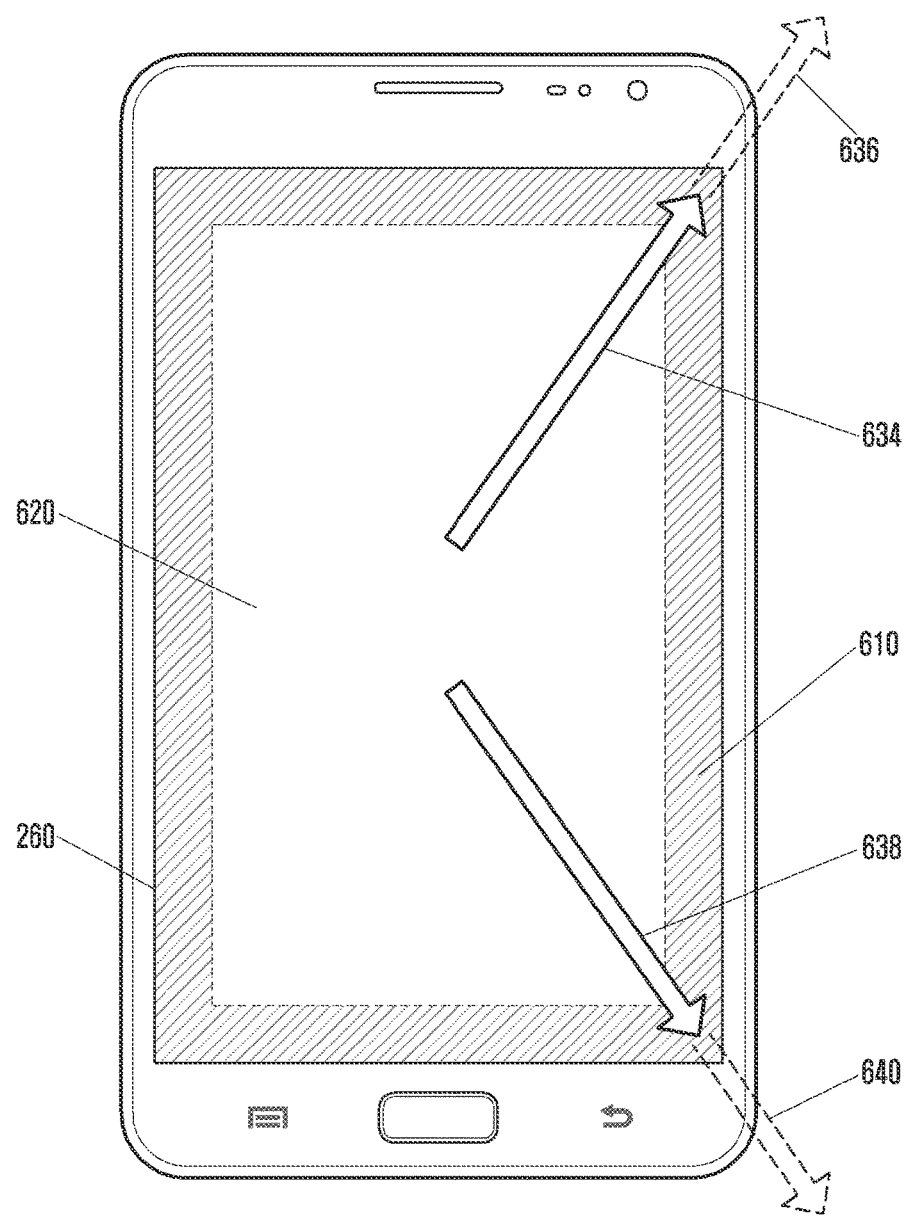
Figure 6E:
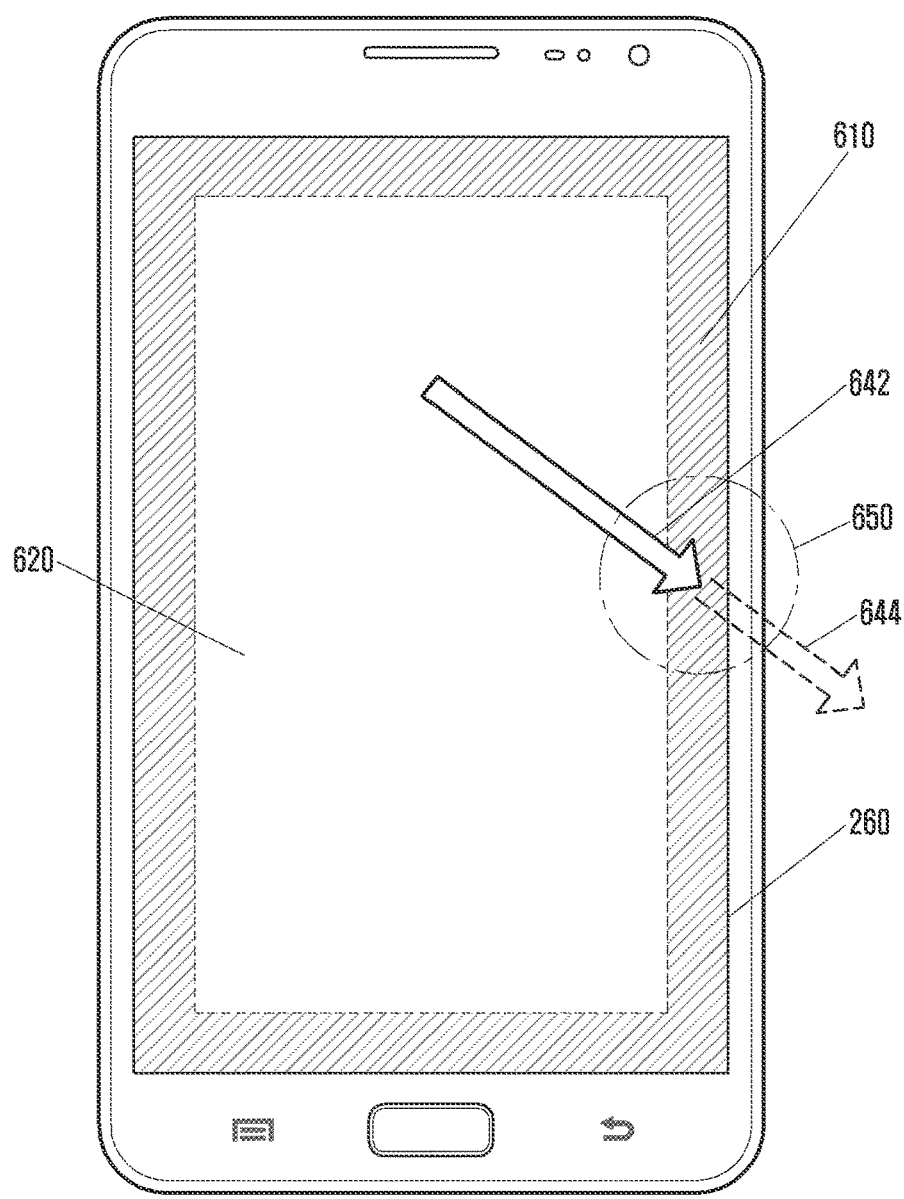
Figure 6F:
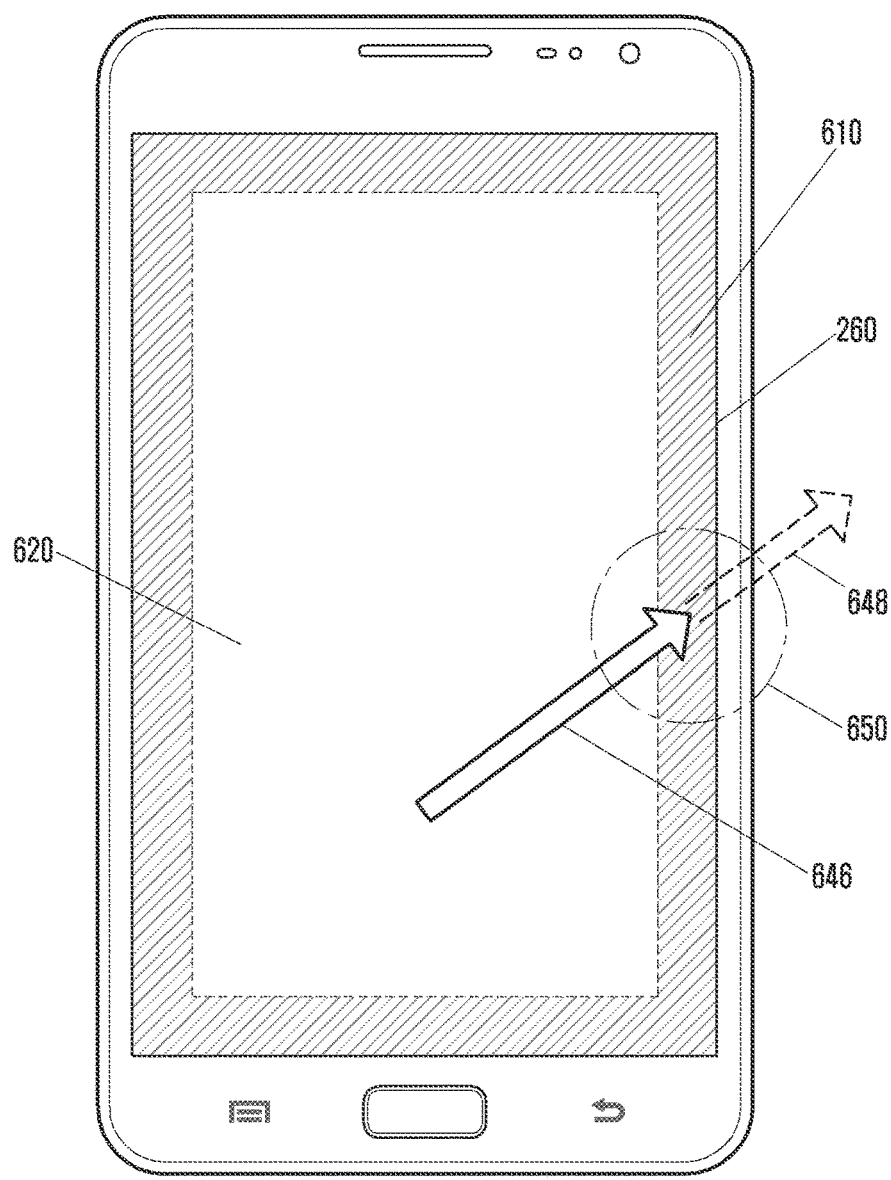

FIGS. 6D to 6F show only a moving pattern without the electronic pen 170. Referring to FIG. 6D, as indicated by a reference numeral 634, a moving path may be extended in a right and upper direction to the outer peripheral region 610 from the inner central region 620. Additionally, as indicated by a reference numeral 636, a moving path may start in a right and upper direction from the inner central region 620, pass through the outer peripheral region 610, and then get out of the detection region of the user input module 250 overlapped with the display module 260. Similarly as discussed above, the moving path 634 may often occur in case of a touch and drag with a button other electronic pen 170 pressed, and the moving path 636 may often occur in case of a hovering of the electronic pen 170. However, sometimes, the former may occur in case of a hovering, and the latter may occur in case of a touch and drag with a button pressed.

Similarly as discussed above, these two moving paths may be mapped with the same or different operations such as, for example, a movement, reduction, or additional enlargement of an enlarged portion in a drawing task. Also, any other particular operation such as loading a photo or file, taking a photo, recording a video, etc. may be mapped.

In addition, as indicated by a reference numeral 638, a moving path may be extended in a right and lower direction to the outer peripheral region 610 from the inner central region 620. Additionally, as indicated by a reference numeral 640, a moving path may start in a right and lower direction from the inner central region 620, pass through the outer peripheral region 610, and then get out of the detection region of the user input module 250 overlapped with the display module 260. Similarly as discussed above, the moving path 638 may often occur in case of a touch and drag with a button other electronic pen 170 pressed, and the moving path 640 may often occur in case of a hovering of the electronic pen 170. However, sometimes, the former may occur in case of a hovering, and the latter may occur in case of a touch and drag with a button pressed.

Similarly as discussed above, these two moving paths may be mapped with the same or different operations such as, for example, a movement, reduction, or additional enlargement of an enlarged portion in a drawing task. Also, any other particular operation such as loading a photo or file, taking a photo, recording a video, etc. may be mapped.

FIGS. 6E and 6F show cases of focusing on a middle part 650 of the outer peripheral region 610 of the user input module 250 overlapped with the display module 260. Referring first to FIG. 6E, as indicated by a reference numeral 642, a moving path may be extended in a right and lower direction to the middle part 650 of the outer peripheral region 610 from the inner central region 620. Additionally, as indicated by a reference numeral 644, a moving path may start in a right and lower direction from the inner central region 620, pass through the middle part 650 of the outer peripheral region 610, and then get out of the user input module 250.

Similarly as discussed above, the moving path 642 may often occur in case of a touch and drag with a button other electronic pen 170 pressed, and the moving path 644 may often occur in case of a hovering of the electronic pen 170. However, sometimes, the former may occur in case of a hovering, and the latter may occur in case of a touch and drag with a button pressed.

Additionally, these two moving paths may be mapped with the same or different operations such as, for example, a movement, reduction, or additional enlargement of an enlarged portion in a drawing task. Also, any other particular operation such as loading a photo or file, taking a photo, recording a video, etc. may be mapped.

Referring to FIG. 6F, as indicated by a reference numeral 646, a moving path may be extended in a right and upper direction to the middle part 650 of the outer peripheral region 610 from the inner central region 620. Additionally, as indicated by a reference numeral 648, a moving path may start in a right and upper direction from the inner central region 620, pass through the middle part 650 of the outer peripheral region 610, and then get out of the user input module 250.

Similarly as discussed above, the moving path 646 may often occur in case of a touch and drag with a button other electronic pen 170 pressed, and the moving path 648 may often occur in case of a hovering of the electronic pen 170. However, sometimes, the former may occur in case of a hovering, and the latter may occur in case of a touch and drag with a button pressed.

Additionally, these two moving paths may be mapped with the same or different operations such as, for example, a movement, reduction, or additional enlargement of an enlarged portion in a drawing task. Also, any other particular operation such as loading a photo or file, taking a photo, recording a video, etc. may be mapped.

Although the above discussion in FIGS. 6B to 6F is focused on only the right peripheral region 612, similar operations may be applied to the left peripheral region 611, the upper peripheral region 613, and the lower peripheral region 614.

Referring again to FIG. 4, if there is any mapped operation at operation 424, operation 426 may follow. Otherwise, operation 428 may follows. At operation 426, the processor 210 may perform a particular mapped operation and display related information on a screen of the display module 260. Then the processor 210 returns to operation 400. Also, the processor 210 may output any information related to the particular operation to the screen before the operation is performed, and may offer a user any notification about whether to perform the operation. Additionally, when the mapped operation is performed, the processor 210 may offer a user any additional notification by means of at least one of a visual effect, sound, perfume, and vibration.

On the other hand, at operation 428, the processor 210 may ignore an input value and then return to operation 400. Alternatively, the processor 210 may display a popup window or a speech balloon for indicating the absence of mapped operation on the display module 260 and then return to operation 400.

If a user is allowed to define a mapped operation, the processor 210 may launch a window for querying whether to map a particular operation on the display module 250 after displaying the absence of mapped operation. In this case, the processor 210 may retrieve a list of available operations from the memory 220 and displays the retrieved list on the display module 250. Such available operations may mean executable operations in each program or application and thus be different according to programs or applications. When a user selects a specific operation, the processor 210 may map the selected operation with the current input and then store this mapping relation in the memory 220. Therefore, if the same input is entered in the same program or application or in an idle state, the mapped operation may be performed. The FIG. 4 embodiment may correspond to a document input mode and hence document-related operations may be mapped.

As discussed above, operations mapped with specific movements may include, but not limited to, a movement, reduction, or additional enlargement of an enlarged portion on the screen, or any other operation such as loading a photo or file, taking a photo, recording a video, and the like. Examples of a mapping relation are shown in Table 1.

TABLE 1

| Input | Operation |
| --- | --- |
| Move to peripheral region by hovering | ← Move leftward in enlarged state<br>↑ Move upward in enlarged state<br>→ Move rightward in enlarged state<br>↓ Move downward in enlarged state<br>↖ Move leftward and upward in enlarged state<br>↗ Move rightward and upward in enlarged state<br>↘ Move rightward and downward in enlarged state<br>↙ Move leftward and downward in enlarged state |
| Move to peripheral region by button plus drag | ← Reduction<br>↑ Loading a file<br>→ Additional enlargement by given ratio<br>↓ Change of camera mode<br>↖ No mapped operation<br>↗ No mapped operation<br>↘ No mapped operation<br>↙ No mapped operation |

As shown in Table 1, a particular operation to be performed in the electronic device may be mapped with a specific user input. Although Table 1 shows that different operations are mapped with a hovering input and a button-pressed drag input, this is exemplary only and not to be considered as a limitation. Alternatively, both inputs may be mapped with the same operation.

Additionally, Table 1 shows a simple mapping relation between a user input and a function to be performed.

However, in another embodiment, the same user input may be differently mapped with two or more functions depending on a moving speed of the input. For example, a hovering input "←" in Table 1 may be mapped with one function in case of a lower speed and with another function in case of a higher speed.

Although operation 422 in the above-discussed embodiment is described as detecting both a moving path and a moving speed, only a moving path may be detected. Namely, without considering a speed, a mapping relation may be defined on the basis of only a moving path of a user input.

Even in case of hovering by a part of human body, the above-discussed embodiment may be equally applied. Namely, the electronic device may also detect a hovering input of a user's body such as a finger as well as the electronic pen 170.

Figure 7:
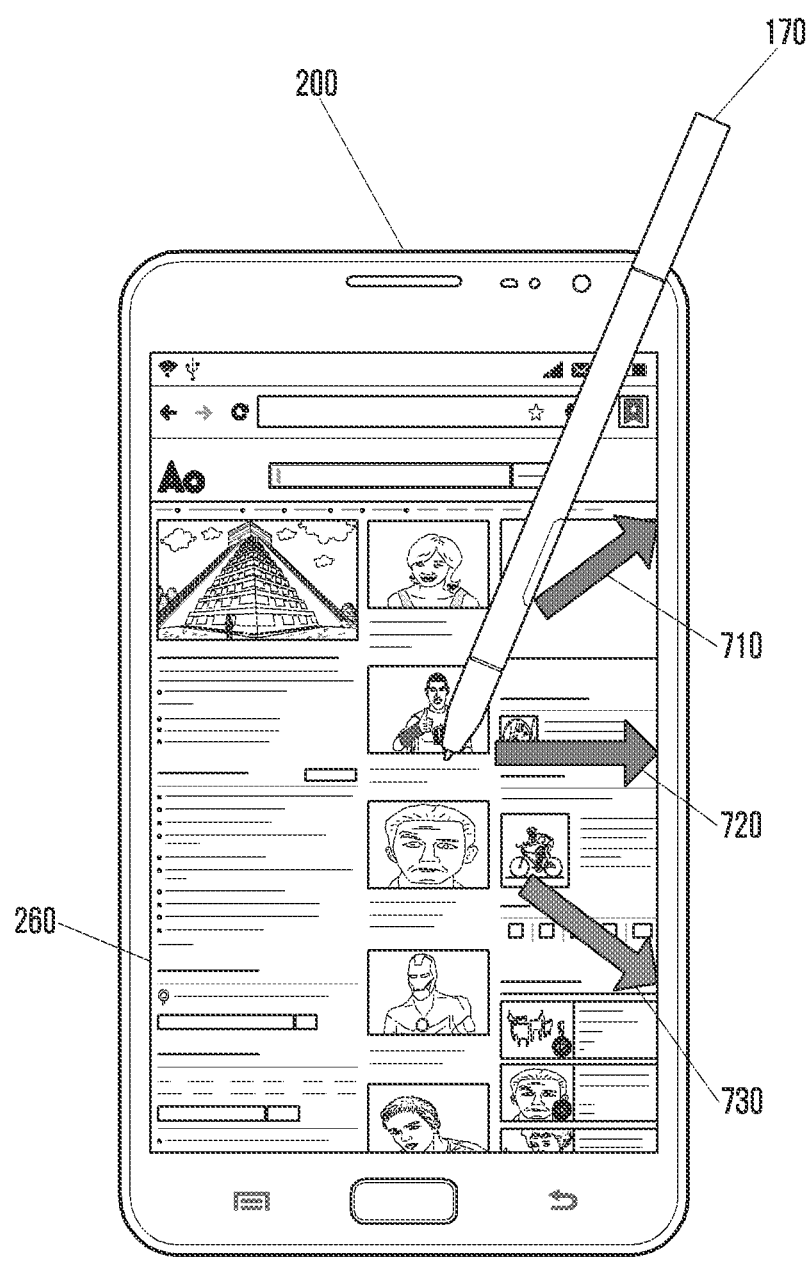
FIG. 7 shows an operation of an electronic device in response to a user input according to another embodiment of the present disclosure.

FIG. 7 shows an operation of an electronic device in response to a user input according to another embodiment of the present disclosure.

Referring to FIG. 7, the front side of the electronic device 200 having the display module 260 is shown. As discussed above, the display module 260 may be overlapped completely or partially with the user input module 250. Additionally, the tip of the electronic pen 170 is located above the inner central region 620, as previously discussed in FIG. 6A, of the user input module 250. The tip of the electronic pen 170 may be touched on the user input module 250 (or on the display module 260) with a button pressed, or be in a hovering state over the user input module 250.

In this state, a movement 710, 720 or 730 of the electronic pen 170 may occur. Then the user input module 250 (or any other sensor) may detect whether the electronic pen 170 passes through and gets out of the peripheral region or stops in the peripheral region. Particular operations to be performed in the electronic device 200 may be mapped in advance with such movements.

In one example of a mapping relation, the first movement 710 may be mapped with a copy of a currently displayed page, the second movement 720 may be mapped with a page move, and the third movement 730 may be mapped with a shift of mode to a desktop mode. Additionally, each movement may be mapped with different operations, depending on whether it is caused by a hovering input of the electronic pen 170 or a button-pressed drag input of the electronic pen 170. Further, even in case of a hovering input, different operations may be mapped depending on whether the button of the electronic pen 170 is pressed or not.

Furthermore, since the user input module 250 can detect the approach of a human body, a hovering of a user's body may also be detected in the same manner as a hovering of the electronic pen 170. Therefore, this disclosure may also be favorably applied to any electronic device having no electronic pen.

Besides, a mapping between a user input and an operation to be performed in response to the input may be predefined by a manufacturer and/or defined by a user.

Figure 8:
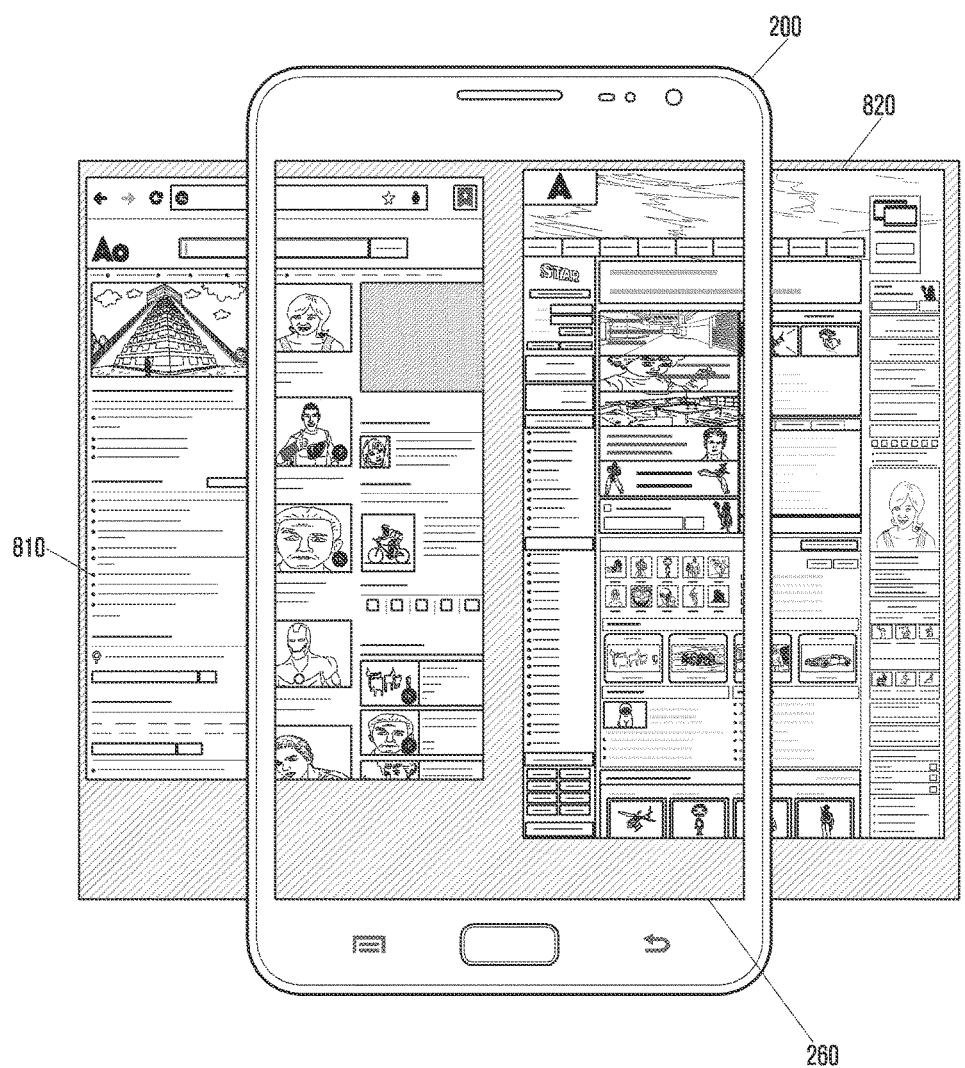
FIG. 8 shows a page swipe in an electronic device according to an embodiment of the present disclosure.

FIG. 8 shows a page swipe in an electronic device according to an embodiment of the present disclosure.

Referring to FIG. 8, a browser program is running in the electronic device 200 and two or more pages are displayed on respective windows in the browser. In this case, if a specific input, e.g., a leftward or rightward movement of the electronic pen 170, mapped with a page move is entered, the previous or next page is displayed sequentially.

In case of a leftward page move, a left page 810 is removed from the uppermost layer displayed on the display module 260 and instead a right page 820 is moved to the uppermost layer. Similarly, in case of a rightward page move, the right page 820 is removed from the uppermost layer displayed on the display module 260 and instead the left page 810 is moved to the uppermost layer.

This embodiment is focused on operations in case a web page is displayed. Similar or different operations may be performed in other programs or applications. For example, in case icons and/or widgets which are arranged on a wallpaper of the electronic device 200 cannot be displayed on a single screen, a similar page move may be applied. Further, in case a specific application has a number of shortcut operations, such operations may be mapped with user inputs by a user, a manufacturer of the electronic device, or a developer of the application. Now, one embodiment will be described with reference to FIG. 9.

Figure 9:
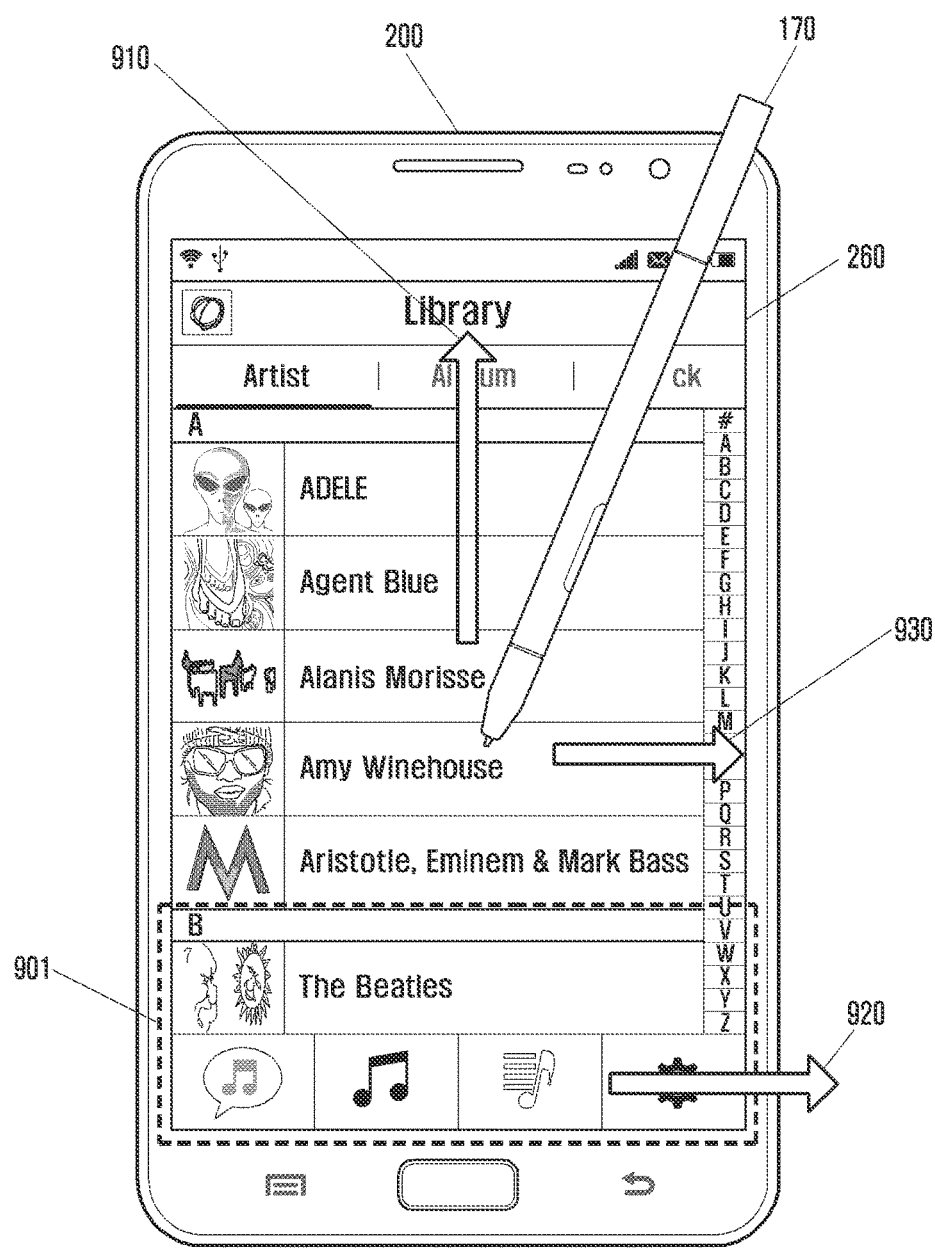
FIG. 9 shows an operation of a music player in an electronic device according to an embodiment of the present disclosure.

FIG. 9 shows an operation of a music player in an electronic device according to an embodiment of the present disclosure.

Referring to FIG. 9, the front side of the electronic device 200 having the display module 260 is shown. As discussed above, the display module 260 may be overlapped completely or partially with the user input module 250. Additionally, as previously discussed in FIG. 7, the tip of the electronic pen 170 is located above the inner central region 620, as previously discussed in FIG. 6A, of the user input module 250. The tip of the electronic pen 170 may be touched on the user input module 250 (or on the display module 260) with a button pressed, or be in a hovering state over the user input module 250.

If the electronic pen 170 moves toward the upper peripheral region 613 as indicated by a reference numeral 910, the processor 210 may perform a particular mapped operation, e.g., a change of a playlist view type. Additionally, if the electronic pen 170 moves downward into a setting window 901 in which libraries, list, etc. are arranged, no operation is performed because of no entrance into the peripheral region. Thereafter, a user may drag rightward the electronic pen 170 with a button pressed. Then the processor 210 may check whether there is a particular operation mapped with this drag input, and if any operation exists, perform the operation. Meanwhile, a movement toward the left peripheral region 611 or toward the right peripheral region 612 from the setting window 901 may be mapped with a separate operation associated with the setting window 901. For example, any hidden list may be moved leftward into the setting window 901 and displayed on the display module 260.

According to various embodiments, the processor 210 may identify a mapped operation depending on a starting position of the tip of the electronic pen 210. For example, a rightward movement 930 of the tip of the electronic pen 210 from a list display region and a rightward movement 920 from the setting window 901 may be mapped with different operations. Namely, if a used program or application has two or more activation regions as shown in FIG. 9, the processor 210 may define different mapping relations corresponding to such activation regions.

As fully discussed hereinbefore, the electronic device in various embodiments of the present disclosure may perform a variety of particular functions in response to a simpler user input. This input mechanism may neither require complex several steps nor additional keys or buttons.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for operating in response to a user input, the electronic device comprising:
a user input device configured to receive a touch input and having an inner region and a peripheral region defined as an outermost area, with a user definable width, that has the ability to detect a touch or hovering state;
a memory configured to store therein a mapping relation between each of inputs from the user input device and each of operations to be performed in the electronic device, each of the inputs being identified based on a direction from the inner region to an outer region in a different direction, and each of the operations being mapped corresponding to a direction of each of the inputs; and
at least one processor configured to:
receive an input from the inner region to the peripheral region,
detect a direction of the received input, when the received input with a pressed button of the electronic device is detected, and
perform an operation mapped to the detected direction,
wherein each of the operations to be performed in the electronic device is mapped by the user, and
wherein the user definable width of each edge of the peripheral region is independently configurable.

2. The electronic device of claim 1, further comprising:
a display configured to display thereon the operation when the mapped operation is performed.

3. The electronic device of claim 2, wherein the at least one processor is further configured to control the display to display an absence of mapped operation when there is no operation mapped to the detected direction.

4. The electronic device of claim 3, wherein the at least one processor is further configured to:
control the display to display a message for querying whether to map an operation together with or after displaying the absence of mapped operation,
control the display to display a list of available operations retrieved from a memory when a mapping is requested via the user input device, and
when a user selects one of the available operations, map the selected operation with the input.

5. The electronic device of claim 2, wherein when the electronic device is in a document input mode for displaying an enlarged portion of a document, the operation mapped to the detected direction is at least one of a movement, reduction, or additional enlargement of the enlarged portion.

6. The electronic device of claim 1, wherein the input from the inner region to the peripheral region includes at least one of a hovering input of an electronic pen, a drag input with a pressed button of the electronic device, a hovering input of the electronic pen with the pressed button, or a hovering input of a part of a user's body.

7. The electronic device of claim 1, wherein the operation mapped to the detected direction is defined depending on a program or an application currently executing in the electronic device.

8. The electronic device of claim 1, wherein the at least one processor is further configured to output a notification by means of at least one of a visual effect, sound, perfume, or vibration when the mapped operation is performed.

9. The electronic device of claim 1, wherein the at least one processor is further configured to ignore the input when there is no operation mapped to the detected direction.

10. The electronic device of claim 1,
wherein the peripheral region is divided into two or more regions corresponding to activation regions of a program or application which is currently executing in the electronic device, and
wherein the at least one processor is further configured to:
identify one activation region corresponding to the divided region of the peripheral region from which the direction is detected, and
perform an operation mapped to the identified activation region.

* * * * *